(12) United States Patent
Chen et al.

(10) Patent No.: US 11,468,203 B2
(45) Date of Patent: Oct. 11, 2022

(54) SYSTEM AND METHOD FOR BENDING AND UNBENDING COMPLEX SHEET METAL BEND REGIONS

(75) Inventors: Weishu Chen, Cerritos, CA (US);
Shengming Liu, Cypress, CA (US)

(73) Assignee: Siemens Industry Software Inc., Plano, TX (US)

( * ) Notice: Subject to any disclaimer, the term of this patent is extended or adjusted under 35 U.S.C. 154(b) by 3043 days.

(21) Appl. No.: 13/613,607

(22) Filed: Sep. 13, 2012

(65) Prior Publication Data

US 2013/0297263 A1 Nov. 7, 2013

Related U.S. Application Data

(60) Provisional application No. 61/643,168, filed on May 4, 2012.

(51) Int. Cl.
*G06F 30/00* (2020.01)
*G06T 19/20* (2011.01)
(Continued)

(52) U.S. Cl.
CPC .............. *G06F 30/00* (2020.01); *G06T 17/10* (2013.01); *G06T 19/20* (2013.01); *G06F 2113/24* (2020.01); *G06T 2219/2021* (2013.01)

(58) Field of Classification Search
CPC ...... G06F 17/50; G06F 2217/42; G06F 30/00; G06T 17/10; G06T 19/20; G06T 2219/2021; G06T 2217/42
See application file for complete search history.

(56) References Cited

U.S. PATENT DOCUMENTS 4,912,644 A * 3/1990 Aoyama ................. G06T 17/10
345/419
6,204,860 B1 3/2001 Singh
(Continued)

FOREIGN PATENT DOCUMENTS

CN 102201020 A 9/2011
EP 1594073 A2 11/2005
(Continued)

OTHER PUBLICATIONS

Duflou et al., "Computer aided process planning for sheet metal bending: A state of the art", Computers in Industry, vol. 56, Issue 7, Sep. 2005, p. 747-771.*
(Continued)

*Primary Examiner* — Boris Gorney
*Assistant Examiner* — Bernard E Cothran

(57) ABSTRACT

Product data management (PDM) systems, methods, and computer-readable media. A method includes receiving a solid body in a PDM data processing system. The method includes determining an operation to perform on the solid body and a target region of the solid body. The method includes moving the target region into a secondary solid body and removing the geometries from the secondary solid body. The method includes generating new geometries corresponding to the operation and the secondary solid body, and applying the new geometries to the topological entities of the secondary solid body. The method includes transforming the adjoining regions to a new position according to the operation. The method includes knitting the transformed adjoining regions to the modified secondary solid body to produce a processed solid body.

20 Claims, 4 Drawing Sheets

(51) Int. Cl.
*G06T 17/10* (2006.01)
*G06F 113/24* (2020.01)

(56) References Cited

U.S. PATENT DOCUMENTS

| | | | |
|---|---|---|---|
| 6,542,937 B1* | 4/2003 | Kask | G05B 19/4097 700/182 |
| 8,305,376 B2* | 11/2012 | Ran | G06F 17/50 345/420 |
| 2004/0118148 A1* | 6/2004 | Ther | F25B 43/006 62/503 |
| 2004/0167759 A1 | 8/2004 | Kawakami | |
| 2005/0248562 A1* | 11/2005 | Maystrovsky | G06T 17/00 345/419 |
| 2008/0281459 A1* | 11/2008 | Liu | G05B 19/40937 700/165 |
| 2010/0106463 A1 | 4/2010 | Hindman et al. | |
| 2012/0059629 A1 | 3/2012 | Hashima et al. | |
| 2012/0078581 A1* | 3/2012 | Mattson | G06F 17/5086 703/1 |
| 2013/0228620 A1* | 9/2013 | Ahern | G01C 15/002 235/439 |

FOREIGN PATENT DOCUMENTS

| | | |
|---|---|---|
| JP | 2000322461 A | 11/2000 |
| JP | 2010522086 A | 7/2010 |

OTHER PUBLICATIONS

PCT Search Report for Appl. No. PCT/US2013/038314, dated Jul. 11, 2013 (13 pages).

* cited by examiner

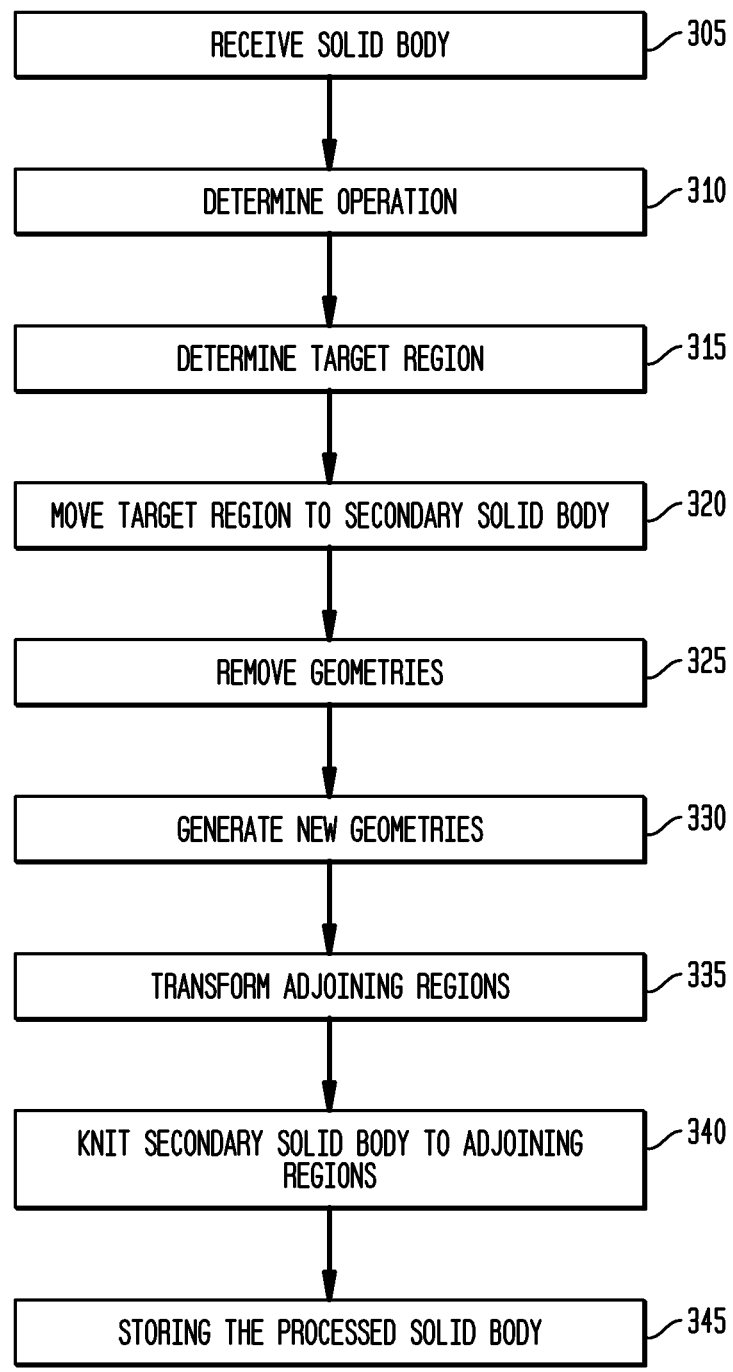

SYSTEM AND METHOD FOR BENDING AND UNBENDING COMPLEX SHEET METAL BEND REGIONS

CROSS-REFERENCE TO RELATED APPLICATION

This application claims the benefit of the filing date of U.S. Provisional Patent Application 61/643,168, filed May 4, 2012, which is hereby incorporated by reference.

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or "PDM" systems).

BACKGROUND OF THE DISCLOSURE

PDM systems manage PLM and other data. Improved systems are desirable.

SUMMARY OF THE DISCLOSURE

Various disclosed embodiments include systems and methods for bending and unbending complex sheet metal bend regions. Other embodiments include PDM systems, methods, and computer-readable media. A method includes receiving a solid body in a PDM data processing system. The method includes determining an operation to perform on the solid body and a target region of the solid body. The method includes moving the target region into a secondary solid body and removing the geometries from the secondary solid body. The method includes generating new geometries corresponding to the operation and the secondary solid body and applying the new geometries to the topological entities of the secondary solid body. The method includes transforming the adjoining regions to a new position according to the operation. The method includes knitting the transformed adjoining regions to the modified secondary solid body to produce a processed solid body.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 3 depicts a flowchart of a process in accordance with disclosed embodiments.

DETAILED DESCRIPTION

FIGS. 1 through 4, the figures depicted and discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Sheet metal bending/unbending technology processes are important criteria used in evaluating a sheet metal system and die design system. With improving sheet metal manufacturing technology, sheet metal products are becoming more and more complex, especially in the bend region which has lots of "add-on" features like rib, bead, dimple, deform, etc. These "add-on" features challenge the bending/unbending capability.

Disclosed embodiments include a generic solution to bend and unbend complex sheet metal bend regions by changing their geometrical data directly, without changing the topological entities.

Disclosed embodiments eliminate the limitation of conventional systems that use techniques that are only good for those bends that have uniform material thickness, have inner and out bend faces that are offsets of each other, and have the side faces (that is, any faces adjacent to a pair of bend faces) are ruled surface and perpendicular with the bend faces.

This limitation is common in main commercial sheet metal design software. Some software uses complex post-procedures to handle non-uniform material thickness regions. However, these solutions only support some common well-defined cases.

Disclosed embodiments overcome these disadvantages.

Figure 1:
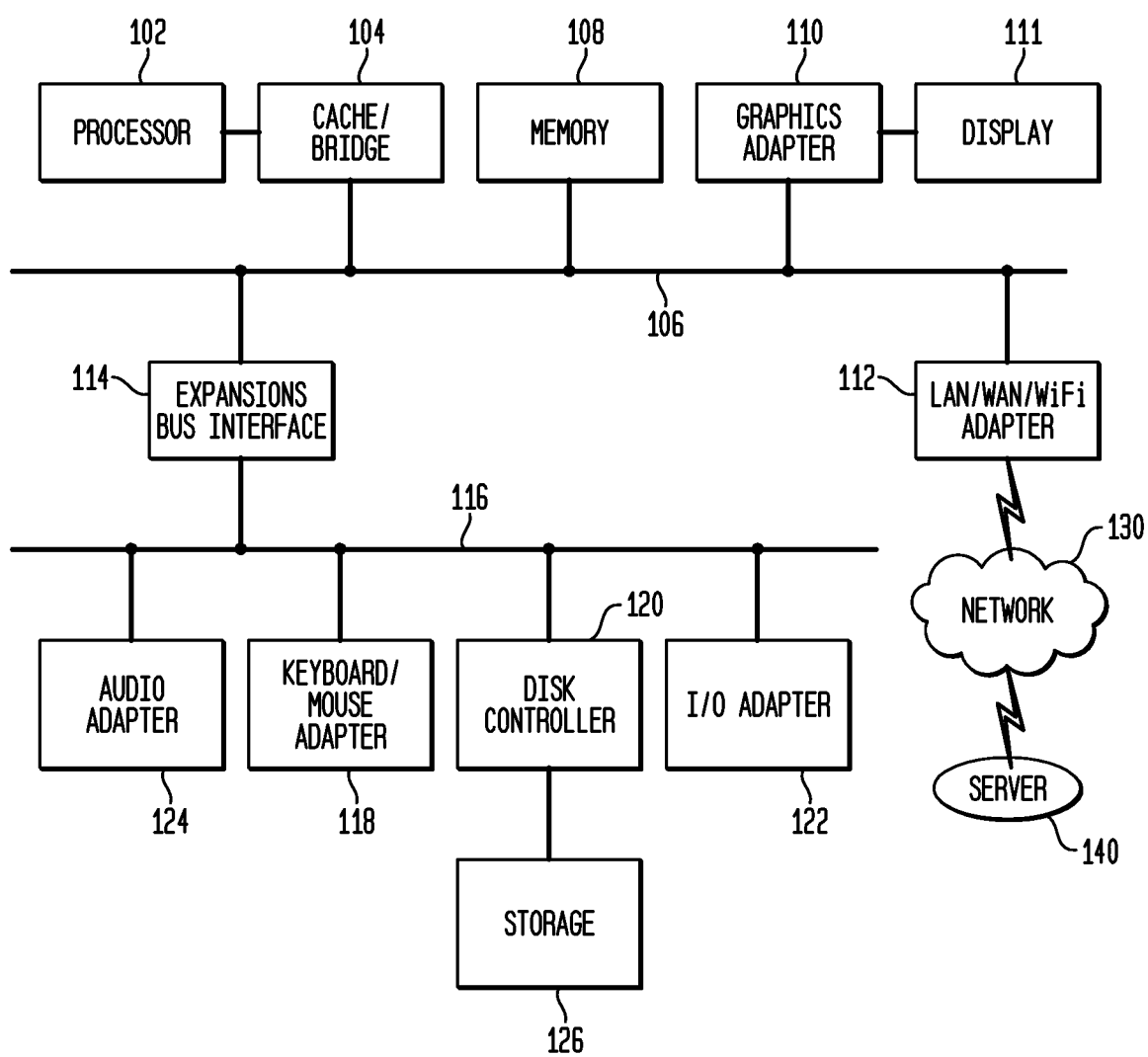
FIG. 1 depicts a block diagram of a data processing system in which an embodiment can be implemented.

FIG. 1 depicts a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Disclosed embodiments include systems and methods that support any bend regions that contain arbitrary geometries by single procedure, without applying additional steps to deal with special geometries.

Processes as described herein include multiple functionalities, including bending, unbending, resizing bend angle, and flat pattern. While performing these basic processes, the system can also insert a bend across any "add-on" features on a sheet metal part, create deformation features across bends in unbent state, rebend the bend regions that have additional features, create the flat pattern for the sheet metal part that contains a complex bend region, or resize a bend angle on a complex bend region.

The generic bend/unbend processes disclosed herein can manipulate the bend region like a "rubber" connector by removing the geometries, including points, curves, and surfaces, from the topological entities, including vertices, edges, and faces. The movable portion can be transformed to new position as rigid solid body. After calculating and regenerating the geometrical data for each topological entity in the bend region, reattach them back to the bend region so it then eventually becomes a valid solid body.

Disclosed embodiments ensure that all geometries in the bend region are accurately deformed, and ensure that the geometry for the boundaries between the bend faces and adjacent transformed or stationary faces is taken from the transformed or stationary adjacent face.

Figure 2:
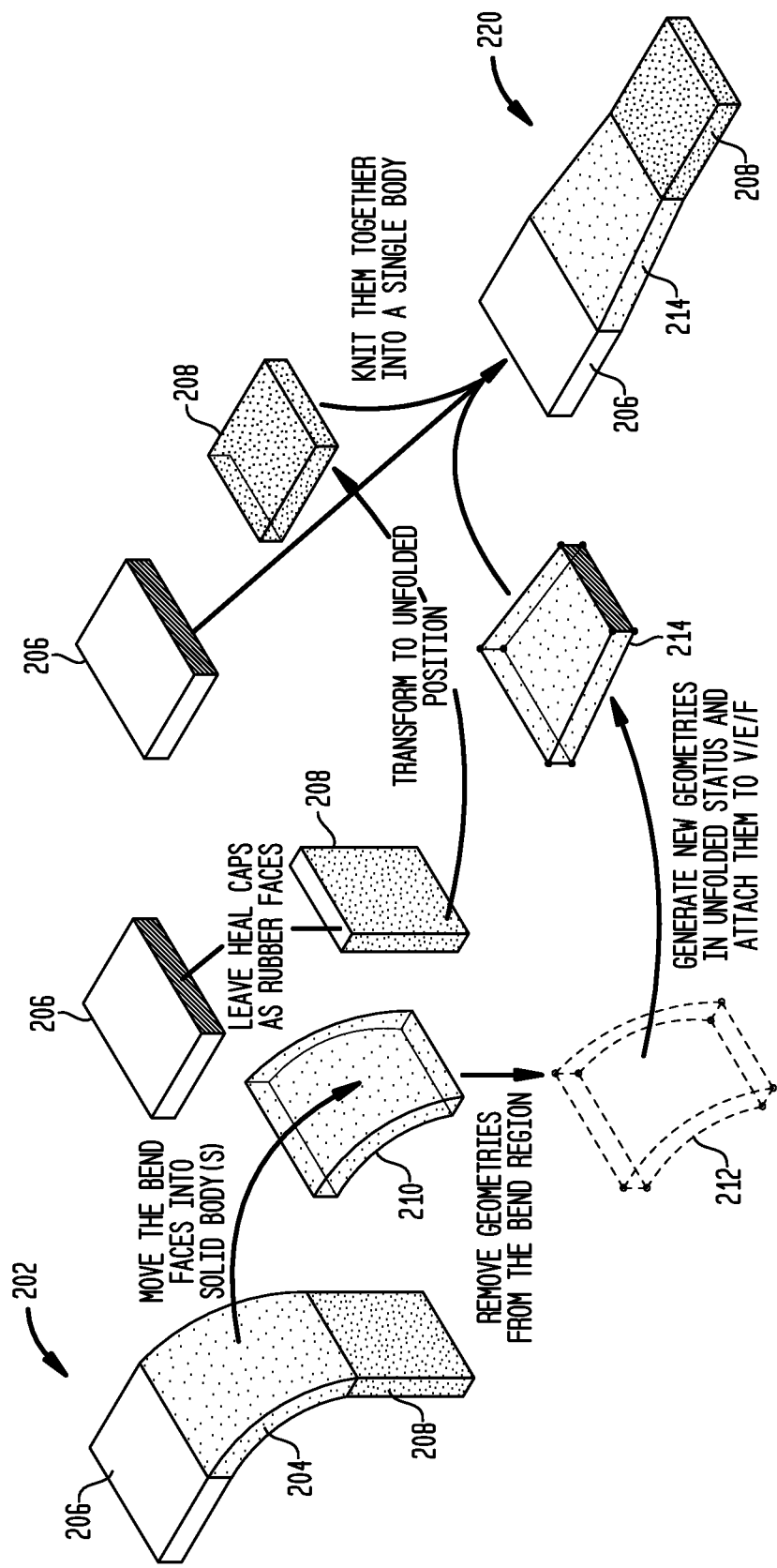
FIG. 2 illustrates an example of a disclosed process that unbends single sheet metal bend.

FIG. 2 illustrates an example of a disclosed process that unbends single sheet metal bend. After the unbend, all topological entities keep unchanged so any non-geometry information such as face color and name will be maintained. The system, as described below, can be a PDM data processing system implemented as one or more data processing systems 100.

FIG. 3 depicts a flowchart of the process being performed to produce the example of FIG. 2. Note that while this exemplary process is specifically an unbend process, the major steps of the process can be the same whether performing a bend, unbend, or other process as described herein. The process of FIG. 3 can be used as a generic process to perform a modification operation on a portion of a solid model.

The system receives a solid body as a PDM model (step 305). In this example, the solid body 202 represents a portion of a sheet metal body that includes a bend region 204. The bend region 204, like the solid body 202, includes a plurality of geometries such as points, curves, and surfaces, and also includes topological entities such as vertices, edges, and faces. Receiving, as used herein, can include loading from storage, receiving from another device or process, receiving via an interaction with a user, or otherwise. PDM model refers to a CAD or other solid object model as manipulated by a PDM system.

The system determines an operation to perform on the solid body (step 310). In this example, the operation is an unbend operation. This can be determined by receiving an operation selection from a user. This can be part of determining that the operation should be performed as part of a larger operation on the solid body or otherwise.

The system determines, based on the operation, a target region for the operation (step 315). In this example, the target region for the unbend operation is bend region 204;

that is, the region on the solid body to be unbent. The solid body may have one or more adjoining regions, shown in this example as regions 206 and 208, that are connected to and part of the same solid body as the target region 204.

The system moves the target region 204 into a secondary solid body 210 (step 320) that includes the same plurality of geometries and topological entities as the target region. This can include forming heal cap faces on the adjoining regions at the "wounds" where the adjoining regions joined the target region. The heal cap faces can be maintained as rubber faces.

The system removes the geometries from the secondary solid body (step 325), leaving only the topological entities illustrated at 212. This step can include, for example, removing the geometries from all vertices, fins, edges, and faces on the secondary solid body.

The system generates a new geometries corresponding to the operation and the secondary solid body (step 330), including applying these new geometries to the topological entities at 212 to produce the modified secondary solid body 214. The modified secondary solid body 214 corresponds to the result of the operation as would be performed on the target region 204. In this case, the modified secondary solid body is the unfolded/unbent bend region. The step of generating the new geometries can be performed using conventional processes for whichever operation is chosen, but the disclosed process is more efficient since neither the adjoining regions nor the topological entities of the target region need be processed.

Generating the new geometries can include calculating the position of vertices and getting curves from the adjoining regions for the corresponding boundary edges of the secondary solid body. This can also include, for internal edges, creating analytic curves where possible or otherwise dividing the edges into points, transferring the points to their new positions, and creating a corresponding b-curve. This can also include, for surfaces, changing them into analytic surfaces where possible or otherwise creating a sheet.

Applying the new geometries to the topological entities can include a number of different processes. It can include attaching points to the vertices, making edges exact by a predetermined tolerance, and attached curves to the edges. If analytic surfaces are created, this can include attaching each analytic surface to a corresponding face, or otherwise can include creating a surface either by filling, lofting, or deformation from the sheet. Applying the new geometries can also include checking orientations to ensure surfaces and edges are correctly oriented. It can include repairing internal edges and faces, where the edges are processed to be sure they lie on their adjacent surfaces and the faces are processed to fix any G1 discontinuities and self-intersecting surfaces. Applying the new geometries can also include resetting the precision on the internal edges.

The system transforms the adjoining regions 206 and 208 to a new position according to the operation (step 335). In this case, the non-bend faces are transformed to the unfolded/unbent position. Because the adjoining regions are separated from the target region, this process can be performed using a simple transform rather than having the faces and geometries of the adjoining regions be processed according to the operation, saving significant processing time and effort.

The system knits the adjoining regions 206 and 208 to the modified secondary solid body 214 (step 340). This produces the processed solid body 220, which corresponds to the original solid body 202 as processed by the operation. Knitting these produces a single solid body, and can including repairing the boundary edges to ensure they lie on their adjacent surfaces and resetting the precision on the boundary edges. This step can also include performing a body check to ensure that no faults are introduced.

The system can then store the processed solid body 220 (step 345).

Note that in the process above, and other processes described herein, various steps can be performed sequentially, concurrently, repeatedly, in a different order, or could be omitted in various embodiments, as may be claimed below. No step, process, or element should be considered essential to any particular disclosed embodiment. In some embodiments, the system can evaluate vertices and edges first, then generate surfaces either by analytical evaluation or deriving from their boundary edges.

In order to guarantee to generate a valid solid body, disclosed processes can use different known approaches to check the geometries on the bend region in the intermediate state as well as the final state. If the check indicates that the target region is invalid, the system can roll back the operation to a point before the error occurred and repair the geometries.

Figure 4A:
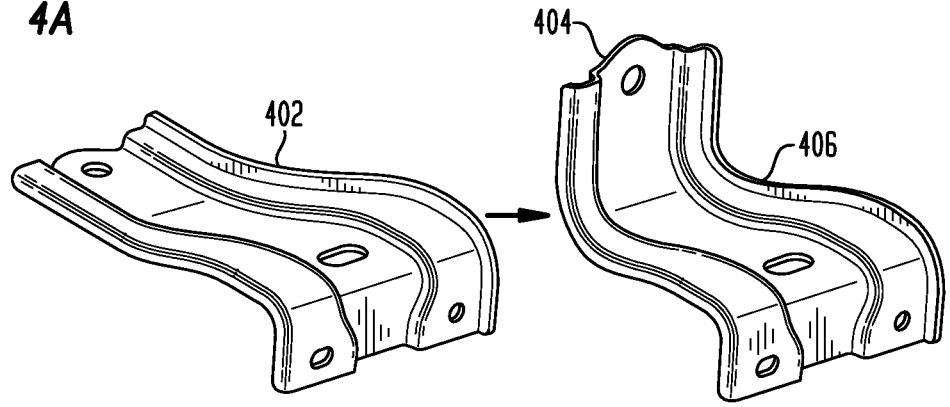
FIGS. 4A-4C illustrate common sheet metal bend operations that can be handled using disclosed techniques.
Figure 4B:
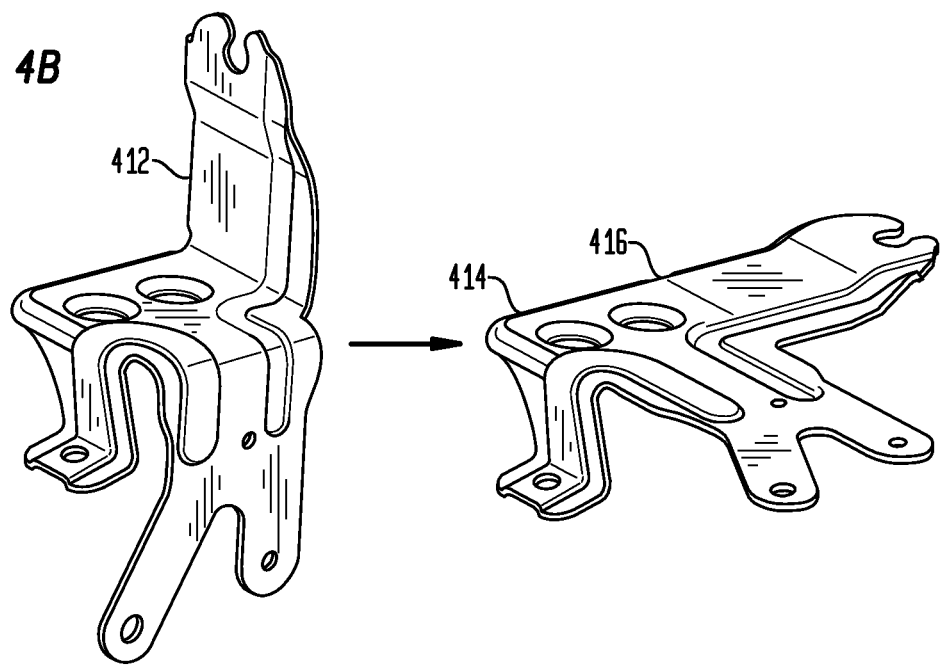
Figure 4C:
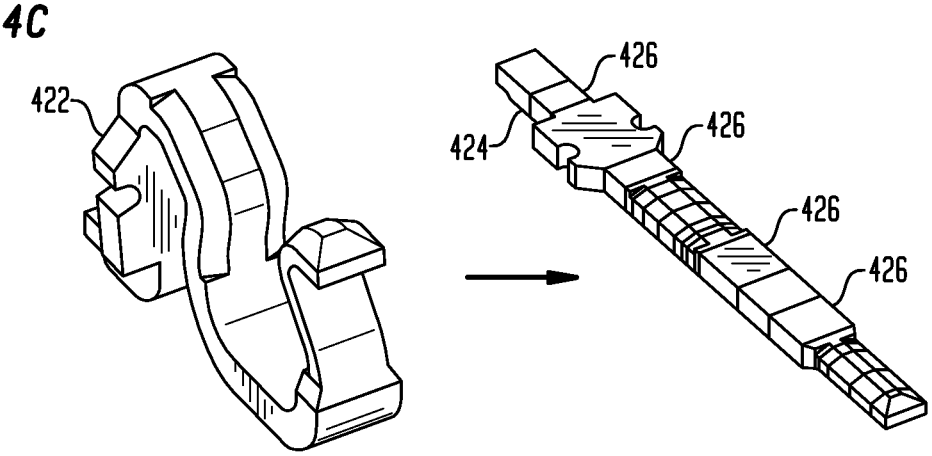

FIGS. 4A-4C illustrate a few common sheet metal bend operations that can be handled using disclosed techniques, indicating an exemplary modified secondary solid body as part of the resulting body after the operation is performed.

FIG. 4A illustrates inserting bends across complex features, where the operation is a bend operation between initial body 402 and resulting body 404, where the bend operation is performed to produce the modified secondary solid body 406 as part of the resulting body 404.

FIG. 4B illustrates unbending the bends with complex features, where the operation is an unbend operation between initial body 412 and resulting body 414, where the unbend operation is performed to produce the modified secondary solid body 416 as part of the resulting body 414.

FIG. 4C illustrates creating a flat pattern for a non-uniform-material-thickness part, where several unbend operations are performed as described above between initial body 422 and resulting body 424, where the unbend operations are performed to produce several modified secondary solid bodies, some of which are indicated at 426, as part of the resulting body 424.

Bending and unbending are common operations on many procedures of sheet metal design and manufacture tool design (e.g. progressive die design, transfer die design and automotive tandem die design), such as creating a flange, contouring flanges, inserting bends and joggle flanges, generating flat patterns, etc., and any such operations can be performed using the techniques described herein.

Disclosed embodiments provide distinct technical advantages over conventional processes. For example, the disclosed techniques are very robust and can be used to unbend and rebend bends with big geometric noise. This improves the capability to manipulate the imported data from other software. Further, disclosed techniques provide a powerful ability to perform sophisticated manipulation on bend regions. Using a specified evaluator function to calculate the new position per the selected operation, the disclosed process can be used to unbend, rebend, change bend angle and radius, create a sheet metal tab, add arbitrary geometries by creating random features such as a dimple, a drawn cutout, counter-sink holes, etc., insert a bend across such features, and perform other operations. Disclosed embodiments also support all kinds of geometries on bends, including chamfers, blends, complex holes, cutouts, deform features, and others.

Disclosed techniques generate stable results during multiple bend/unbend processes, and improve performance significantly since they do not use expensive modeling APIs such as Boolean operations.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for performing a modification operation on a solid body, comprising through operation of at least one processor:
   receiving a solid body in a product data management (PDM) data processing system;
   determining an operation to perform on the solid body and a target region of the solid body, the solid body including at least one adjoining region connected to the target region and the target region having a plurality of geometries and topological entities;
   moving the target region into a secondary solid body, wherein the secondary solid body includes the same plurality of geometries and topological entities as the target region;
   removing the geometries from the secondary solid body;
   generating new geometries corresponding to the operation and the secondary solid body, and applying the new geometries to the topological entities of the secondary solid body, to produce a modified secondary solid body;
   transforming the adjoining regions to a new position according to the operation; and
   knitting the transformed adjoining regions to the modified secondary solid body to produce a processed solid body and storing the processed solid body in the PDM data processing system.

2. The method of claim 1, wherein the operation is an unbend operation, and the target region is the region of the solid body to be unbent.

3. The method of claim 1, wherein the operation is a bend operation, and the target region is the region of the solid body to be bent.

4. The method of claim 1, wherein the PDM data processing system also forms heal cap faces on the adjoining regions where the adjoining regions joined the target region.

5. The method of claim 1, wherein removing the geometries includes removing geometries from all vertices, fins, edges, and faces on the secondary solid body.

6. The method of claim 1, wherein the geometries include points, curves, and surfaces.

7. The method of claim 1, wherein the topological entities include vertices, edges, and faces.

8. A product data management (PDM) data processing system for performing a modification operation on a solid body, comprising:
   at least one processor; and
   an accessible memory, wherein the at least one processor of the PDM data processing system is configured to:
     receive a solid body;
     determine an operation to perform on the solid body and a target region of the solid body, the solid body including at least one adjoining region connected to the target region and the target region having a plurality of geometries and topological entities;
     move the target region into a secondary solid body, wherein the secondary solid body includes the same plurality of geometries and topological entities as the target region;
     remove the geometries from the secondary solid body;
     generate new geometries corresponding to the operation and the secondary solid body, and applying the new geometries to the topological entities of the secondary solid body, to produce a modified secondary solid body;
     transform the adjoining regions to a new position according to the operation; and
     knit the transformed adjoining regions to the modified secondary solid body to produce a processed solid body, and storing the processed solid body in the PDM data processing system.

9. The PDM data processing system of claim 8, wherein the operation is an unbend operation, and the target region is the region of the solid body to be unbent.

10. The PDM data processing system of claim 8, wherein the operation is a bend operation, and the target region is the region of the solid body to be bent.

11. The PDM data processing system of claim 8, wherein the PDM data processing system also forms heal cap faces on the adjoining regions where the adjoining regions joined the target region.

12. The PDM data processing system of claim 8, wherein removing the geometries includes removing geometries from all vertices, fins, edges, and faces on the secondary solid body.

13. The PDM data processing system of claim 8, wherein the geometries include points, curves, and surfaces.

14. The PDM data processing system of claim 8, wherein the topological entities include vertices, edges, and faces.

15. A non-transitory computer-readable medium encoded with computer-executable instructions that, when executed, cause at least one processor of a product data management (PDM) data processing system for performing a modification operation on a solid body to:

receive a solid body;

determine an operation to perform on the solid body and a target region of the solid body, the solid body including at least one adjoining region connected to the target region and the target region having a plurality of geometries and topological entities;

move the target region into a secondary solid body, wherein the secondary solid body includes the same plurality of geometries and topological entities as the target region;

remove the geometries from the secondary solid body;

generate new geometries corresponding to the operation and the secondary solid body, and applying the new geometries to the topological entities of the secondary solid body, to produce a modified secondary solid body;

transform the adjoining regions to a new position according to the operation; and knit the transformed adjoining regions to the modified secondary solid body to produce a processed solid body, and storing the processed solid body in the PDM data processing system.

16. The computer-readable medium of claim 15, wherein the operation is an unbend operation, and the target region is the region of the solid body to be unbent.

17. The computer-readable medium of claim 15, wherein the operation is a bend operation, and the target region is the region of the solid body to be bent.

18. The computer-readable medium of claim 15, wherein the PDM data processing system also forms heal cap faces on the adjoining regions where the adjoining regions joined the target region.

19. The computer-readable medium of claim 15, wherein removing the geometries includes removing geometries from all vertices, fins, edges, and faces on the secondary solid body.

20. The computer-readable medium of claim 15, wherein the geometries include points, curves, and surfaces and the topological entities include vertices, edges, and faces.

* * * * *